B. M. W. HANSON.
FLUID PRESSURE INDEXING MECHANISM.
APPLICATION FILED APR. 18, 1906.

912,124.

Patented Feb. 9, 1909.

Witnesses:
S. S. Grotta.
H. E. Anderson.

Inventor:
B. M. W. Hanson
By his Attorney,

B. M. W. HANSON.
FLUID PRESSURE INDEXING MECHANISM.
APPLICATION FILED APR. 18, 1906.

912,124.

Patented Feb. 9, 1909.
6 SHEETS—SHEET 3.

Fig. 4.

Witnesses:
S. S. Grotta.
F. E. Anderson

Inventor:
B. M. W. Hanson
By his Attorney,

Fig. 5.

B. M. W. HANSON.
FLUID PRESSURE INDEXING MECHANISM.
APPLICATION FILED APR. 18, 1906.

912,124.  Patented Feb. 9, 1909.
6 SHEETS—SHEET 4.

Witnesses:
S. S. Grotta
F. E. Anderson

Inventor:
B. M. W. Hanson
By his Attorney,

B. M. W. HANSON.
FLUID PRESSURE INDEXING MECHANISM.
APPLICATION FILED APR. 18, 1906.

912,124.

Patented Feb. 9, 1909.

Witnesses:
S. S. Grotta
F. E. Anderson

Inventor:
B. M. W. Hanson
By his Attorney,

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

FLUID-PRESSURE INDEXING MECHANISM.

No. 912,124.  Specification of Letters Patent.  Patented Feb. 9, 1909.

Application filed April 18, 1906. Serial No. 312,430.

*To all whom it may concern:*

Be it known that I, BENGT M. W. HANSON, a citizen of Sweden, having declared my intention of becoming a citizen of the United States, residing at Hartford, in the county of Hartford and State of Connecticut, have invented certain new and useful Improvements in Fluid-Pressure Indexing Mechanism, of which the following is a specification.

This invention relates to a new and useful improvement in devices for actuating intermittingly various parts of machinery, and is designed more especially for those machines in which stock is operated on by a tool, although it may be utilized generally with many kinds of apparatus in which indexing-mechanism is required, and is not limited in scope to any specific art.

Primarily the object of the invention is the provision of mechanism, whereby a shaft will be indexed to present an article held thereby in different relations either to a tool or to stock operated on by the tools of a turret or other device.

In the illustrations the particular type of the apparatus to which the invention is applied is styled an "indexing-machine," or a machine which presents certain parts as required by the character of the operations, for which said apparatus is designed.

In a construction like that hereinafter described a work-holding arbor may be presented to a cutter (not shown) both lineally and with such indexing-movement as may be desired, and as this is being done the work-indexing mechanism is moved into position to be again operated when one phase of the work is completed, and the work is again presented to the tool in readiness for the next action of said tool, or a turret or other device may be carried by the arbor, and may be indexed in the manner required by the operations necessary to be accomplished.

In the accompanying drawings.

Like numerals designate similar parts throughout the several views.

Referring to the drawings, the numeral 1 designates a bed upon which is fitted to slide by appropriate mechanism a stock or frame 2, in which is mounted the mechanism hereinafter described. Journaled in bearings 3 and 4 of the stock 2 is a spindle 5 having a bore 6 and a head 7. Between the bearings 3 and 4 and splined to the tubular spindle 5 is a worm-wheel 8, held to said spindle by a nut 9, and engaging a worm 10 on a shaft 11 journaled in the stock. Head 7 of the spindle is made with two concentric beads, one 12 at the edge, and the other 13 near the bore 6 of said spindle the latter having a beveled surface 14, and there being around the bore 6 a recess 15 in said head from which passages 16 lead to the periphery of said head. Fitting within the bore 6 is a tubular shaft 17 for holding the device to be indexed, said shaft having a collar 18 at one end bearing against the extremity of spindle 5.

Beyond the head 7 and loosely mounted with relation to the projecting end of shaft 17 is a circular casing 19, having a bearing 20 at the top. This casing 19 has a rear side-plate 21 through a central hole of which the shaft 17 passes and a concentric flange 22 with a rabbet 23 which fits upon a similar surface of the head 7, and to which head said flange is bolted. At its other side the case 19 is closed by a face-plate 24, which is held in position by bolts 25, the heads of which are received in countersinks of the plate and casing. Between the head 7 and the plate 21 a chamber 26 is formed, in which is placed a clamp-disk 27 fitted to and splined for slight sliding movement upon the shaft 17, said disk having an inner concentric groove 28 whose walls fit in the recess 15 of head 7, and an outer face 29. One wall of the groove 28 has a beveled face 30 engaging the beveled face 14 of bead 13 of head 7, and in this bead 13 are recesses for the reception of plungers 31 and springs 31' said plungers bearing against one face of the clamp-disk 27.

Within the casing 19 and snugly fitting against the inner walls of the same, is an annulus 32 having a worm-gear 33, and fastened to its inner side a stop or abutment 34, there being fastened to the side-plate 21 of the casing 19 another stop or abutment 35, said stops being of a depth to equal the width of the chamber in the casing.

In the bearing 20 of the casing 19 is formed a transverse chamber 36 above the annulus 32, and in this chamber is journaled a worm 37 on a shaft 37' operated by a handle 38 and engaging the worm-gear 33 of the annulus 32, so as to adjust the stop 34 at any desired distance from the permanent stop 35 to thereby vary the throw of a detent carrier as will hereinafter appear.

In the face-plate 24 is an enlarged axial bore 38, and in this bore is fitted a hub 39 which rests at its end against the inner face of the side-plate 21 of the casing 19, and has a shoulder 41, which abuts against said faceplate 24. Sleeved upon the hub 39, and held thereto by a key 42, is a hub 43 of a wing-piston 44, which is of the width of the annulus 32 and of the space between the end 21 of the case 19 and said face-plate 24. On each face of this wing-piston 44 are formed guide-grooves for the motive-fluid, and rigid with and extending radially from the hub 39 is a carrier shown as an arm 45 having an outward extension 46 in which is formed a chamber 47. In this chamber 47 is located a piston-valve 48, having collars 49 and 50 which snugly fit the chamber, and a reduced barrel 51 between the collars 49 and 50. At the top this piston-valve 48 is provided with a tooth or detent 52, and in the piston-valve chamber is formed a port 53 opening into said chamber at the outer side of the collar 50, with two ports 54 and 55, one slightly below the other, adjacent to its upper end, and with two disalined intermediate ports 56 and 57.

Secured to the end of shaft 17 adjacent to the hub 39 is a gear-wheel 60, connected by an intermediate double-idler pinion 61 loose on a stub-shaft 61' with a gear 62, which is secured by pins 62' or otherwise, to a toothed wheel 63, and this toothed-wheel is sleeved loosely on, but is not in engagement with, the shaft 17 beyond the gear-wheel 60, the teeth 63 of the toothed-wheel 63 being in line with the tooth or detent 52 of the piston-valve 48.

Formed in the permanent stop or abutment 35 is a chamber 65 having an opening 66 leading into the space in the casing between the two stops 34 and 35 to the left of the wing-piston 44. At the outer end of this chamber is a port 67, and at its sides are the two opposing ports 68 and 69 out of line with each other. In this chamber is located a piston-valve 70 having one end 71 fitted in the opening 66, the opposite end 72 forming a collar and closing at certain times the port 67. Another collar 73 is formed on the valve and it is provided with a reduced stem 74 between the collars, both ports 68, 69 opening into said chamber 65 between collars 72 and 73, when the valve is in the position illustrated in Figs. 4, 5 and 6.

In the casing 19 is a port 75 communicating with the interior of the chamber 26 on the side of the clamp-disk 27 away from the plungers 31 of the head 7,—this disk being one of many clutching devices with which my improvement may be employed without departure from the invention.

Convenient to the mechanism thus far described, and located in the stock 2 is controlling valve-mechanism designated in a general way by 76. A chamber 77 having an end opening 78 is formed in said stock, and in this chamber is a piston-valve 79 adapted to be shifted longitudinally by any suitable device either automatically or by hand. In the end-opening 78 of the chamber 77 is a plug 80 having a port 81, and on the piston-valve 79 are three collars 82, 83 and 84, a reduced portion 85 between the collars 82 and 83, and a reduced portion 86 between the collars 83 and 84. Ports 87 and 88 formed in the stock open into one side of the chamber 77, and ports 89, 90 and 91 open into the opposite side of said chamber, all of the ports being located and arranged with relation to the piston-valve 79 and its collars 82, 83 and 84, as illustrated in Figs. 4, 5 and 6 of the drawings.

Figure 1:
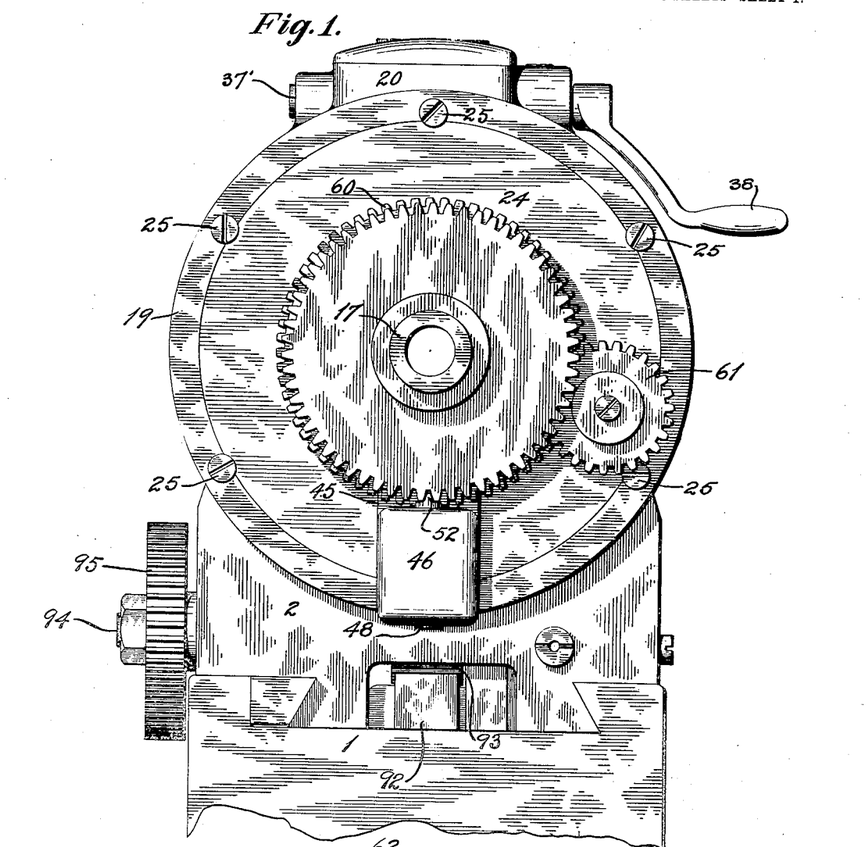
Figure 1 represents an end view of part of a machine provided with the invention.
Figure 2:
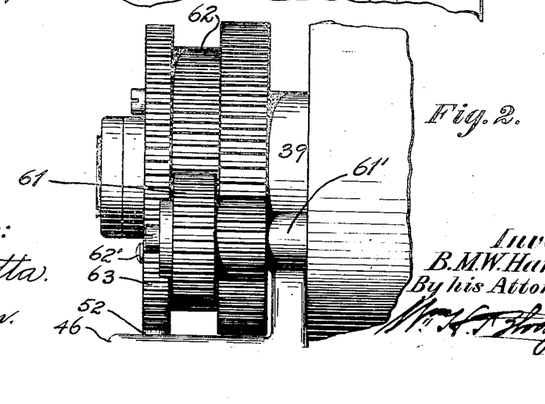
Fig. 2 is a partial side view.
Figure 3:
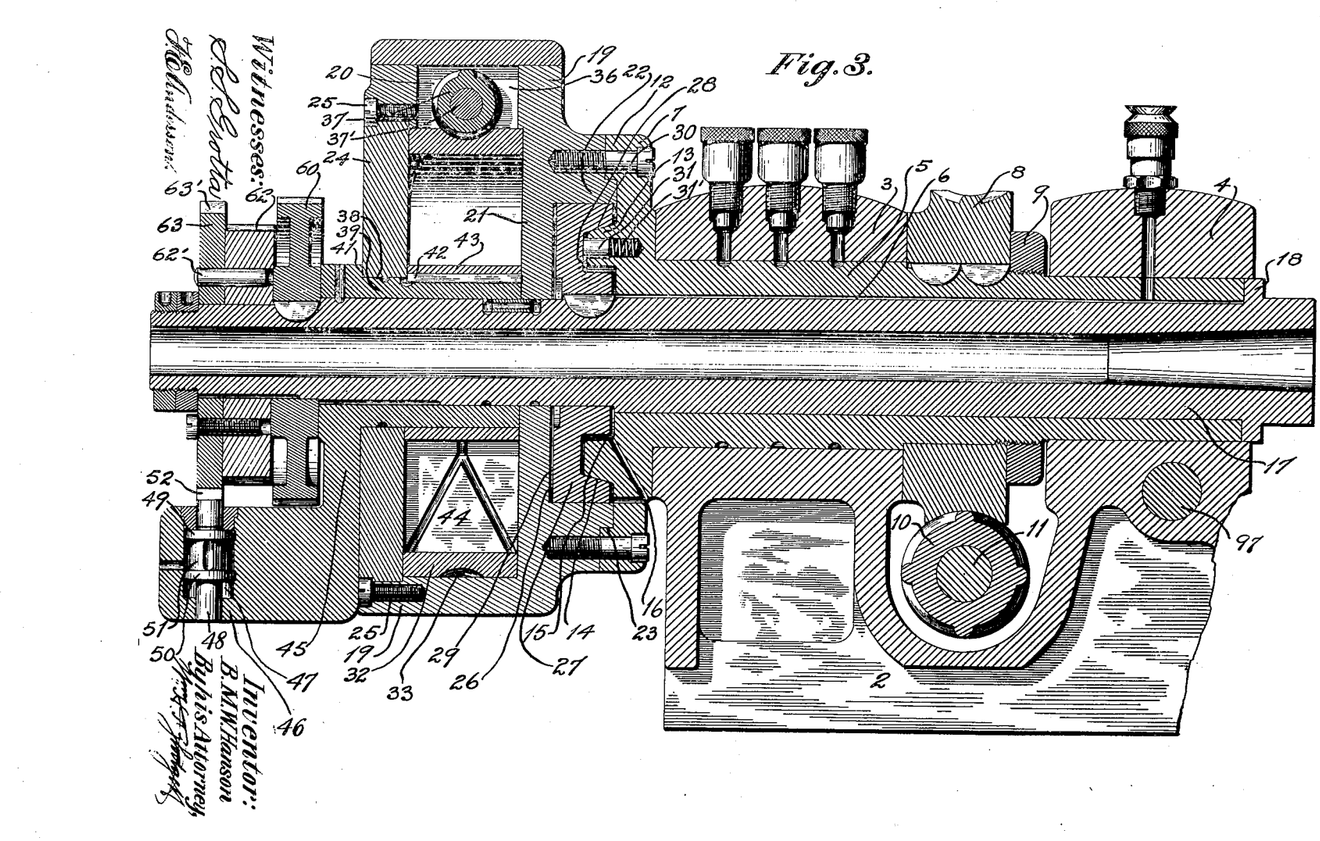
Fig. 3 is a longitudinal vertical section of a machine embodying the invention.
Figure 4:
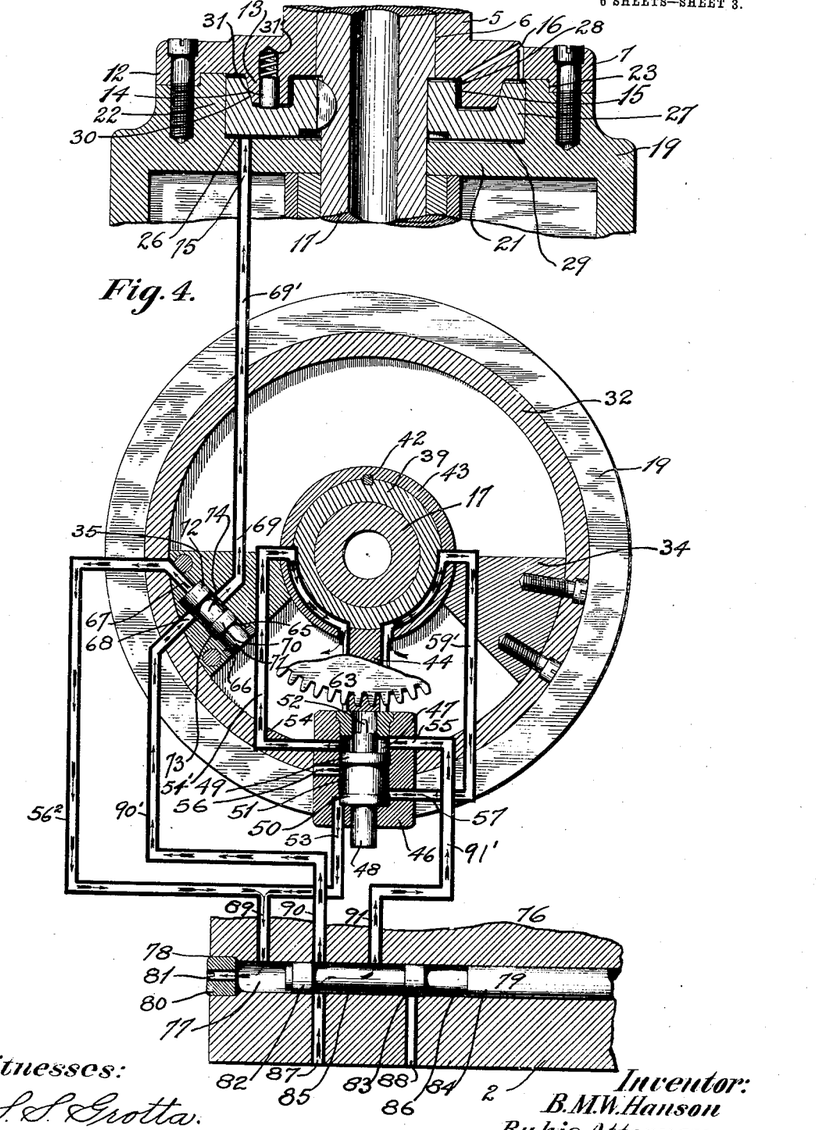
Fig. 4 represents a view in section of portions of the invention showing diagrammatically the relation of the several motive-fluid passages, and illustrating their accurate connection with the ports, but not their location. This figure indicates the position of the mechanism when the detent is withdrawn from the toothed indexing-wheel and the oscillatory piston is at its lowest point in readiness to make its operative stroke.
Figure 5:
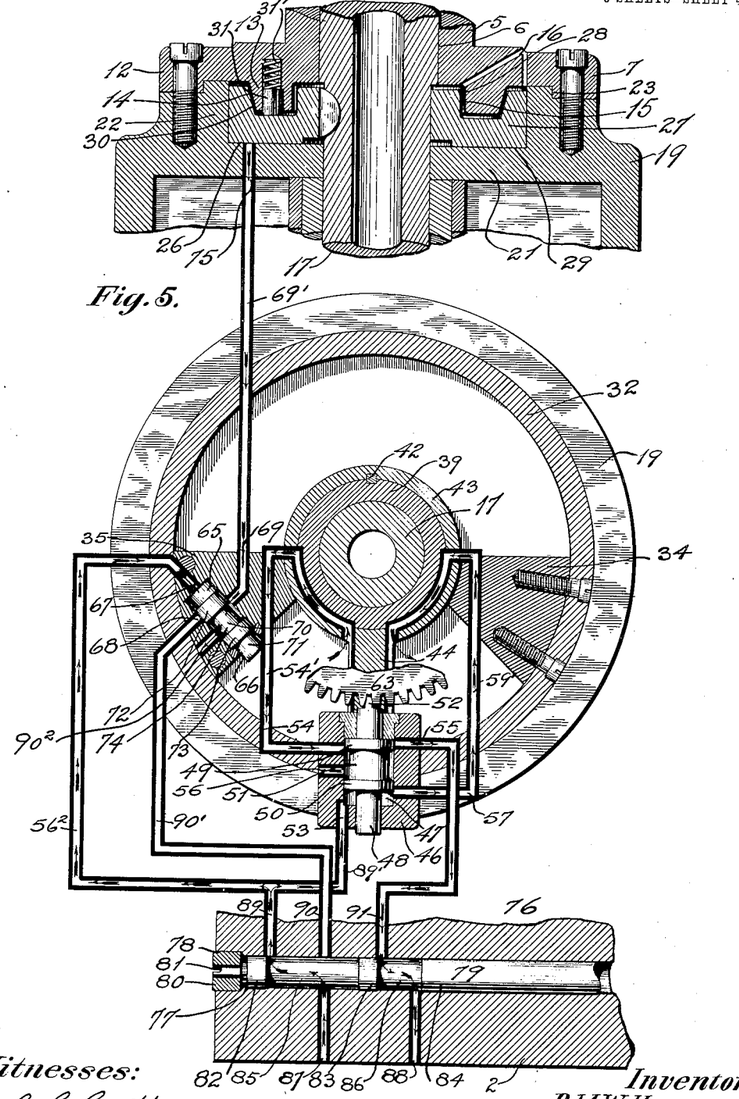
Fig. 5 is a view similar to Fig. 4 showing the detent in engagement with the toothed-wheel and the wing piston in readiness to commence its operative stroke.
Figure 6:
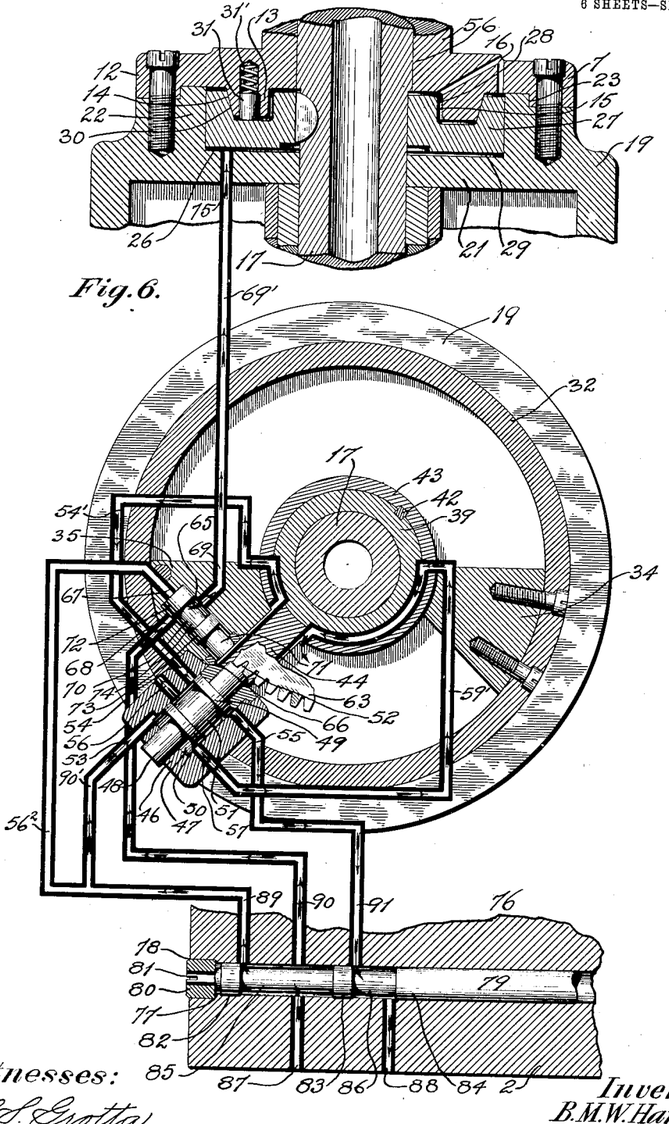
Fig. 6 is a similar view showing the position of the wing-piston when it has finished its operative stroke, and is against a stationary stop or abutment projecting inwardly from the wall of the chamber of the casing in which it operates.
Figure 7:
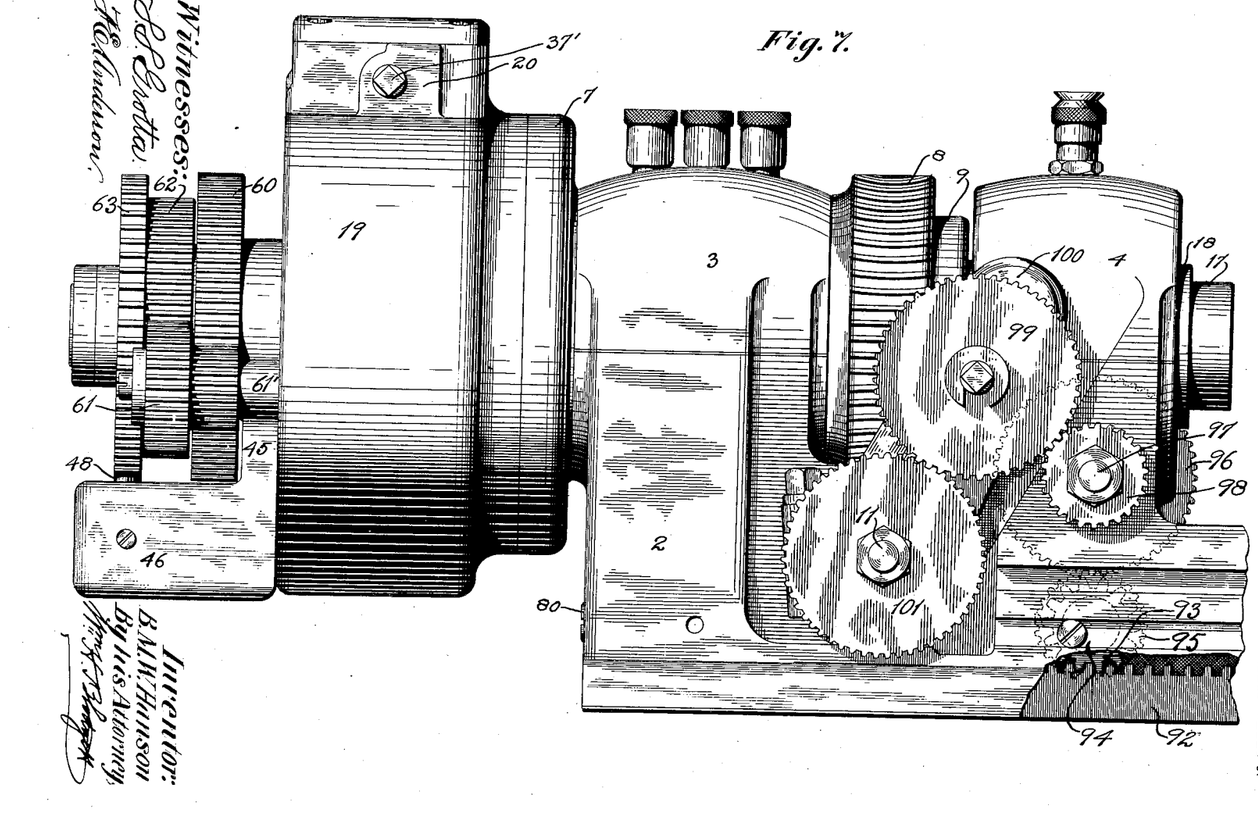
Fig. 7 is a side elevation of the indexing-head.

As before stated Figs. 4, 5 and 6 illustrate diagrammatically the arrangement and location of the parts of the invention, and in these figures the ports already detailed are shown and indicated accurately, but the conduits which connect the several ports are illustrated in a manner to indicate more clearly the operation of the invention, and will be disposed in the machine as circumstances and experience of those skilled in the art may dictate. In other words, in these figures the casing 19 and contained parts are shown partially in transverse and partially in longitudinal section to illustrate diagrammatically an arrangement of the conduits and ports which will work well in practice, although it will be understood, as stated, that so far as the views are concerned the conduits will be arranged in actual practice to coöperate with the ports and valve-mechanism in proper relation and timing in the operation of the machine.

When the parts are disposed as indicated in the diagrammatic view Fig. 4, the piston-valve 79 has been moved to the right, and the motive-fluid enters port 87, passes between collars 82 and 83, out through port 91, through a conduit 91' to the port 55, and through this port 55 into the cylinder 47 above the collar 49,—thus pushing the piston-valve 48 downward, moving the detent 52 away from the toothed wheel 63, and opening the port 57, the collar 50 being moved below this port and over the port 53. By this withdrawal of the detent 52 from the toothed-wheel 63, connection of the wing-piston 44, its hub 43, the hub 39, and its arm 45, with the shaft 17 through the gearing at the end of said shaft is disestablished. Motive-fluid now passes through the top of the cylinder 47, out of the port 54, through a conduit 54' to the face of the wing-piston 44 towards the permanent stop or abutment 35, thus actuating the wing-piston 44 and causing it and its hub 43 to move toward the adjustable stop or abutment 34 carrying with it the hub 39, arm 45, having outward extension 46 and detent 52. Fluid to the right of wing-piston 44 is now forced out through a conduit 59' connected with the port 57 of the cylinder 47, and passes into said cylinder between the collars 49 and 50, and from thence through the port 56 to the atmosphere. A portion of the motive-fluid passing through the port 87, into the piston-valve chamber 77 passes through the port 90, through a conduit 90', and through a port 68 into a cylinder 65 between the collars 72 and 73 of the piston-valve thereof, the pressure within the wing-piston chamber against the end 71 of the valve-piston 70 having forced the piston outward, and from thence through the port 69, a conduit 69' and port 75 in the case 19 into the chamber 26 and acts against the clamp 27 forcing the beveled surface 30 thereof upon the beveled surface 14 of head 7, thus clutching the shafts 5 and 17 together. When the wing-piston 44 has made its traverse toward the stop 34 of the adjustable annulus 32 and has reached the extremity of its throw the piston-valve 79 is moved, and assumes the position shown in Figs. 5 and 6, thus closing the port 81 in the end of chamber 77 and disposing the valve in different relation to the other ports. When the valve is in the position shown in said figures motive fluid passes through the port 87 to the conduits 89, 89' to the chamber 47 below the piston-valve 48, thus raising said valve and causing its detent 52 to engage the toothed-wheel 63. Fluid now passes under the piston-valve 48 through the port 57, and through a conduit 59' to the right hand side of the wing-piston 44 filling the space between said wing-piston and the stop 34 of adjustable annulus 32. Motive-fluid also passes from the port 89 through a branch-conduit $56^2$ to the port 67 of the chamber 65, thus forcing the piston-valve 70 inward closing the passages through the chamber 65 between the ports 68 and 69, and shutting off the pressure delivered by conduit 69' through the port 75 into the chamber 26, allowing the spring-actuated plungers 31 to force the clamp 27 away from the beveled surface 14 of the head 7 of spindle 5, thus releasing the shaft 17 from said spindle 5, so that said shaft may be rotated idly therein by the gearing heretofore described, thus presenting the gear-blank or other article held by shaft 17 in a new position with relation to the action of the cutter. When the pressure causes the wing-piston 44 to move away from the adjustable stop 34 and towards the permanent stop 35, the fluid to the left of the wing-piston is exhausted and then permits the pressure at the port 67 to force inward the valve 70, as has been stated. As the wing-piston 44 is turned towards the permanent stop 35 air in front of, and displaced by, the wing-piston is exhausted through the conduit 54' which admitted it, port 54, the chamber 47 above the collar 50 of piston 48, and port 56, to the atmosphere. As the piston 44 travels toward the abutment 35 the detent 52 of piston-valve 51 being in engagement with the index-wheel 63 turns said wheel and its attached gear 62, and through the gearing 61 actuates the gear 60 keyed to the shaft 17, and thus (the spindle being released) indexes the shaft and brings another portion of the gear or other article held thereby into position for operation.

Designated by 92 is a rack, which is fixed to the bed 1, and in mesh with said rack, is a pinion 93 carried by a shaft 94, journaled in the sliding head or stock 2. On the end of said shaft 94 is a gear 95 in mesh with another gear 96 carried by a shaft 97, and rigid with said shaft 97 is a pinion 98 in engagement with a change-gear 99, carried by a swinging-arm 100, said change-gear engaging a gear 101 on the shaft 11 of the gear 10. From what has been stated it will be seen that when the head or stock 2 is reciprocated the gearing described will rotate the spindle 5 and shaft 17 (then clutched together) and will thus enable a spiral tooth to be formed. If a spur-tooth on the blank is required the gearing described may be disconnected by removing the change-gear 99, when of course no rotary movement will be imparted to the shaft 11. This gearing is but one of various mechanisms which may be employed for accomplishing the result described, and the invention is not limited thereto.

As will be evident when the spindle 5 and shaft or arbor 17 are united by the clutching-devices a firm and unyielding support is provided which will rigidly present the article to the action of a tool, or will steadily sustain a tool-carrying device while an implement thereof is at work upon the stock.

In practice most, if not all, of the operations carried out by the mechanism will, of course, be automatically controlled, but hand-mechanism for actuating the valve 79, and the gearing 8, 10 may be employed, and the adjustment of annulus 32 is preferably manually-controlled by means of the lever or crank 38.

Changes may be made in many details of the mechanism, and the invention is not limited to the precise devices shown and described, nor to their arrangement horizontally, vertically, or otherwise.

Having thus described my invention, what I claim is—

1. The combination with a shaft, and with a casing surrounding the same, of an annulus adjustable within the casing; a stop carried by the annulus; a piston movable within the casing; means for admitting motive-fluid to the casing to actuate the piston; an indexing-wheel loose on the shaft; a piston having a detent for engaging said indexing-wheel; a carrier for said piston, said carrier being rigidly connected with the piston in the casing; means for admitting motive-fluid to, and exhausting it from, the piston or engaging the indexing-wheel; and gearing controlled by said indexing-wheel for indexing the shaft.

2. The combination, with a tubular spindle, of a shaft within said spindle; a gear secured to said shaft; a toothed-wheel loose upon the shaft; mechanism for connecting said toothed-wheel with the gear upon the shaft; a piston-valve having a detent adapted to engage the toothed-wheel; a carrier rigid with the piston within the casing for supporting said piston-valve; a cylinder in the carrier; and means for admitting motive-fluid to, and exhausting it from, said cylinder.

3. The combination, with a tubular spindle, of a casing rigid therewith, a shaft within the spindle; means for clutching the spindle and casing to said shaft; a rotary piston within the casing; means for supplying motive-fluid to, and exhausting it from, said casing; an arm having a hub to which said rotary piston is secured; and means actuated by said arm for indexing the shaft.

4. The combination, with a tubular spindle, and with a casing rigid therewith, of a shaft mounted for rotation within the spindle; means for clutching the spindle and shaft; means for supplying motive-fluid to the casing; an arm having a hub loose on the shaft; a wing-piston secured to said arm; and located between the walls of the casing; a detent carried by the arm; and means actuated by said detent for indexing the shaft.

5. The combination with a tubular spindle, and with a shaft journaled for rotation therein, of a casing rigid with said spindle, a rotary piston within the casing, means operated by said piston, for indexing the shaft, an annulus located in the casing, means for adjusting the annulus, and a stop carried by the casing and coöperating with said annulus to govern the throw of said piston.

6. The combination, with a tubular spindle, of a shaft rotatable within said spindle; a casing rigid with the spindle; means for clutching the spindle and shaft; an annulus adjustable within the casing; a stop carried by said annulus; a fixed stop in the casing; a piston within the casing; means for moving said piston in an arcuate path; and means actuated by the piston in the casing for indexing the shaft.

7. The combination, with a tubular spindle, of a casing rigid with said spindle, a shaft rotatable within the spindle; a fixed stop carried by the casing; an annulus within the casing; means for adjusting said annulus; a stop carried by the annulus; a wing-piston within the casing, and movable between said stops; a toothed-wheel loose on the shaft; a detent actuated by the piston within the casing for rotating said toothed-wheel; and gearing for connecting the toothed-wheel with the shaft.

8. The combination, with a tubular spindle, and with a shaft rotatable within said spindle, of a casing rigid with the shaft; an annulus within the casing; gearing for adjusting the annulus; a stop carried by the annulus; means actuated by fluid-pressure for clutching the spindle and shaft; a stop carried by the casing; a valve in said stop; a conduit for connecting the valve in the stop with the clutch; means for supplying motive-fluid to, and exhausting it from, the valve-chamber; a piston within the casing; means for supplying motive-fluid to, and exhausting it from, the casing; and means actuated by said piston for indexing the shaft.

9. The combination, with a tubular spindle, and with a shaft journaled for rotation therein, of a casing rigid with the spindle; means for clutching the shaft and spindle; fluid-pressure means for operating the clutch; a piston within the casing; means for supplying motive-fluid to, and exhausting it from said casing; indexing-mechanism for the shaft; and means actuated by the piston within the casing for operating said indexing-mechanism.

10. The combination, with a tubular spindle, and with a casing rigid therewith, of a shaft within the spindle; means for clutching the spindle and shaft, and for releasing the clutch-connection; a geared annulus within the casing; a gear for actuating said annulus;

a stop carried by the annulus; a stop rigid with the casing; a piston in the casing, said piston being movable between the stops; means for supplying motive-fluid to, and exhausting it from, the casing; and shaft-indexing-mechanism operated by said mechanism within the casing.

11. The combination, with a tubular spindle, and with a shaft mounted for rotation therein, said spindle having a head, of a casing rigid with said head; a friction-clutch slidable upon the shaft, and adapted to connect said head with said shaft; means actuated by fluid-pressure for establishing the relation between the clutch and head; means for releasing the clutch when the supply of motive-fluid is cut off; a pair of stops, one of which is adjusted with relation to the other, and located in the casing; a piston movable in the casing between said stops; indexing-mechanism for the shaft; and means operated by the piston within the casing for actuating said indexing-mechanism.

12. The combination, with a tubular spindle, and with a shaft mounted for rotation within the same, of a clutch slidable upon the shaft, and adapted to connect the spindle thereto; a casing carried by the spindle; a pair of stops within the casing; means for adjusting one of said stops with relation to the other stop; a piston within the casing; an arm having a hub located within the casing, and to which hub the piston is secured; means for supplying motive-fluid to the casing, and for exhausting it therefrom; a detent carried by the arms; means for advancing and withdrawing said detent; a wheel with which said detent is adapted to engage; and gearing actuated by said wheel for indexing the shaft.

13. The combination, with a tubular spindle, having a head provided with a clutch-surface, of a shaft located within the spindle; a clutch movable on said shaft, and connected to rotate therewith; a casing rigid with the spindle; a pair of stops in said casing; means for adjusting one of said stops with relation to the other stop; a piston within the casing; indexing mechanism for said shaft; and means controlled by said piston within the casing for actuating the indexing-mechanism.

14. The combination, with a tubular spindle, having a head provided with a friction-clutch surface, of a shaft within said spindle; a friction-clutch element slidable upon, and rotatable with said shaft; spring-actuated plungers for releasing the clutch-connection between the spindle and shaft; means for supplying motive fluid to one clutch-element, to force said clutch element upon the other clutch-element; stops within the casing; means for adjusting one stop with relation to the other stop; a hub rotatable upon the shaft; a piston within the casing, and rigid with said hub; means for supplying motive-fluid to, and exhausting it from, the casing between the stops thereof; a support rigid with the hub; a detent mounted in a chamber of said support; means for supplying motive-fluid to, and exhausting it from, said chamber; a piston within the chamber, said piston carrying the detent; a gear-wheel loose upon the shaft, and adapted to be engaged by the detent of the piston; and means actuated by said gear-wheel for indexing the shaft.

15. The combination, with a tubular spindle, and with a shaft revoluble therein, of means for clutching and unclutching said spindle and shaft; a casing rigid with the spindle; an annulus within the casing; a wheel for adjusting said annulus; a stop carried by the annulus; a stop carried by the casing; a valve in said stop carried by the casing; fluid-connections between the chamber of said valve and one of the clutch-elements; an oscillatory piston within the casing; means for supplying motive-fluid to, and exhausting it from, the casing; and mechanism actuated by the oscillatory piston for indexing the shaft.

16. The combination, with a tubular spindle, and with a shaft revoluble therein, of means for clutching and unclutching said spindle and shaft; a casing rigid with the spindle; an annulus within the casing; a gear for adjusting said annulus; a stop carried by the annulus; a stop carried by the casing; a valve in said stop carried by the casing; fluid-connections between the chamber of said valve and one of the clutch-elements; an oscillatory piston within the casing; means for supplying motive-fluid to, and exhausting it from, the casing; mechanism actuated by the oscillatory piston for indexing the shaft; fluid-connections for actuating an element of said mechanism; and a valve for controlling the supply of the motive-fluid to, and its exhaust from, said fluid connections.

17. The combination, with a rotary casing, of a shaft surrounded by said casing; a piston within the casing; stops within the casing; means for supplying motive fluid to and exhausting it from, the casing; an arm having a hub surrounding the shaft, to which hub the oscillatory piston is connected; a detent carried by the arm; and gearing actuated by the detent for actuating said shaft.

18. The combination, with a rotary casing, of a shaft surrounded by said casing; means for clutching the casing and shaft; an oscillatory piston within the casing; stops within the casing, and which serve to limit the arc of travel of said piston; means for supplying motive-fluid to, and exhausting it from, the casing; a gear loose upon the shaft; a detent for engaging said gear; means controlled by the piston for actuating said detent in an arcuate path; a gear rigid with said shaft; and back-gearing actuated by said loose gear for operating the gear rigid with the shaft, and thus indexing said shaft.

19. The combination, with a rotary casing, of a shaft around which said casing may operate; means for clutching the casing and shaft together; a device for releasing the same; a piston oscillatory within the casing; stops one of which is adjustable within the casing, and serving to limit the stroke of the piston; means for supplying motive-fluid to, and exhausting it from, the casing; an arm having a hub to which the oscillatory piston is rigidly secured; a detent carried by said arm; and shaft-indexing mechanism actuated by the detent.

20. The combination, with a casing, of a rotary spindle to which said casing is secured; a shaft within the spindle, and over which the casing is mounted; clutch-mechanism for connecting the casing and shaft; an adjustable stop within the casing, a fixed stop within the casing, said fixed stop having a valve-chamber; a valve in said valve-chamber; connections for supplying motive-fluid to, and exhausting it from, the valve-chamber; and a conduit leading from the valve-chamber to a point in the casing opposite one of the clutch-elements.

21. The combination, with a casing, of a rotary spindle to which said casing is secured; a shaft within the spindle; and over which the casing is mounted; clutch-mechanism for connecting the casing and shaft; an adjustable stop within the casing; a fixed stop within the casing, said fixed stop having a valve-chamber; a valve in said valve-chamber; connections for supplying motive-fluid to, and exhausting it from, the valve-chamber; a conduit leading from the valve-chamber to a point in the casing opposite one of the clutch - elements; and a main valve for controlling the supply of fluid to said valve-chamber.

22. The combination, with a casing, of a stop fixed to the inner side thereof, and having a cylinder; supply and exhaust-conduits connected with said cylinder; a valve in said cylinder; outer and inner shafts; an oscillatory piston within the casing; means for supplying motive-fluid to, and exhausting it from, the casing; means associated with said oscillatory piston for indexing the inner shaft; a clutch controlled by said valve for connecting the outer and inner shafts; and a conduit communicating with a part of said casing, and through which motive-fluid is supplied for actuating the clutch.

23. The combination, with a tubular spindle, of a shaft; a casing rigid with said tubular spindle; an oscillatory piston within the casing; a geared annulus within the casing; means for rotating said annulus; a stop rigid with the annulus; a stop rigid with the inner wall of the casing, and having a cylinder; means for supplying motive-fluid to, and exhausting it from, said cylinder; a valve in the cylinder; a clutch; a conduit leading from the cylinder, and transmitting pressure therefrom to the clutch to lock said tubular spindle and shaft together; and mechanism for indexing the shaft when the clutch is released.

24. The combination, with a tubular spindle having a head, of a casing secured to said head, and having a recess in its inner wall; a shaft within the tubular spindle; a clutch located in the recess of the casing; fluid-pressure devices for actuating said clutch to lock the spindle and shaft together; means for releasing the clutch; an oscillatory piston within the casing, and loosely mounted with relation to the shaft; and means for releasing the clutch; an oscillatory piston within the casing, and loosely mounted with relation to the shaft; and means controlled by said oscillatory piston for indexing the shaft when the clutch is released.

25. The combination, with a tubular spindle, and with a shaft mounted for rotation in said spindle, of a casing secured to the spindle, and having a recess in its inner wall; a clutch for connecting the spindle to the shaft, and rotating in said recess; a complemental clutch-surface carried by the tubular spindle; means for releasing the clutch from engagement with said surface; means for indexing the shaft when the clutch is released; and means for forcing the clutch into engagement with a complemental clutch-surface after the shaft has been indexed.

26. The combination, with a casing, and with a rotary spindle to which said casing is secured, of an annulus, within the casing; worm - teeth rigid with said annulus; a worm in engagement with said worm-teeth; a shaft within the casing; a stop carried by the annulus; a stop projecting from the casing; an oscillatory piston mounted for movement around said shaft, said piston being located in the casing; an arm actuated by said piston; a detent carried by the arm; means controlled by fluid-pressure for actuating said detent; a toothed-wheel engaged by the detent, and loose on the shaft; a gear rigid with the toothed-wheel, and also loose on the shaft; a gear rigid with the shaft; and gearing connecting the gear of the toothed-wheel with the gear rigid with the shaft.

27. The combination, with a casing, and with an annulus having a gear-ring mounted therein, of a gear in mesh with said gear-ring; a stop carried by the annulus; a stop carried by the casing; a hub sleeved upon the shaft, and having an arm provided with a cylinder; an oscillatory piston rigid with said hub; means for supplying motive-fluid to, and exhausting it from, the cylinder in the arm; a piston mounted in said cylinder, said piston having a detent at one end; a toothed wheel loose upon the shaft, and with which the detent is adapted to engage; gearing actuated by the toothed-wheel for indexing the shaft; a device for clutching the casing to the shaft; means for supplying motive-fluid to, and exhausting it from, the casing; and means controlled by fluid-pressure for actuating the clutching device.

In testimony whereof I affix my signature in presence of two witnesses, at Hartford, Connecticut, this 13th day of March, 1906.

BENGT M. W. HANSON.

Witnesses:
KATHRYN T. M. O'CONNELL,
SOLON E. DAVIS.